June 14, 1966 — F. S. SILLARS — 3,255,856
SIDE SEAM SOLDERING MACHINES
Filed Nov. 13, 1963 — 2 Sheets-Sheet 1

Inventor
Frederick S. Sillars
By his Attorney
Richard B. Megley

June 14, 1966  F. S. SILLARS  3,255,856

SIDE SEAM SOLDERING MACHINES

Filed Nov. 13, 1963  2 Sheets-Sheet 2

United States Patent Office 3,255,856
Patented June 14, 1966

3,255,856
SIDE SEAM SOLDERING MACHINES
Frederick S. Sillars, Beverly, Mass., assignor to United Shoe Machinery Corporation, Flemington, N.J., a corporation of New Jersey
Filed Nov. 13, 1963, Ser. No. 323,387
16 Claims. (Cl. 193—1)

This invention relates to apparatus for soldering can bodies and, more particularly, to novel guide means for ensuring alinement integrity of a can body to be soldered during its traverse of the solder applicating portion of a machine such as described in U.S. Patent 3,056,368, issued October 2, 1962, in the name of the present inventor, and my Patent No. 3,190,528, issued June 22, 1965. In the afore-referenced patents there is disclosed apparatus for soldering can bodies comprising conveyor means for moving the bodies lengthwise of a track and means having member engageable with the can body to impart pressure thereto. This apparatus does not employ an internal mandrel for guiding the can bodies but rather the conveyor and pressure applying means, in cooperation with guide rails, move the can bodies in the desired path. With this apparatus the bodies are relatively free to flex.

The teachings of the prior art and commercial usage have heretofore been confined to employment of guide rods which were rigidly affixed to the machine. That is, prior to the subject invention a can body which was introduced to a soldering machine was loosely alined in the path of travel by rigid guide rods disposed on opposite sides of the line of travel and affixed to support members mounted on the machine. Integrity in alinement was not accurately ensured entirely as a result of the rigid character of the guide means which did not provide the flexibility required to accommodate the tolerance in can body dimensions for a given can size. The rigid bars or rods were adjusted loosely to guide a can body having a diameter equal to the maximum allowed under the manufacturing tolerance. Thus, can bodies of a given size having a diameter below the maximum allowed by the production tolerance were not necessarily accurately guided and, therefore, their alinement integrity was not ensured at the point of solder application.

A further deficiency present in the rigid guide rods discussed above is inability to accommodate various can sizes. That is, when a change in the can size being manufactured is desired, the entire guide rod and mounting therefor must be dismantled and new mounting means provided to position the rods in location to accommodate the new can size. The need for such changes is obviously time consuming and, therefore, costly.

The utilization of a rigid or solidly affixed guide means also deterred remedial action when a jam occurred in the flow of can bodies. When a can body became jammed or stuck for some reason, the guide rods were in a position which impeded ready access thereto thereby complicating and delaying correction of the difficulty. Further, since the guide rods were not yieldable, when a can jam occurred forces were built up which were applied directly to the members of the machine in contact with the cans. The result was potential damage to the machine.

Accordingly, an object of the present invention is to provide soldering apparatus having guide means capable of maintaining accurate alinement of a can body passing therealong.

A correlated object of the above is to provide guide means yieldingly responsive to the tolerance in can body dimensions thereby to ensure alinement integrity of can bodies to be fabricated regardless of dimensional inconsistencies.

A further object is to provide guide means readily and accurately adjustable to accommodate different can body sizes.

A still further object is to provide guide means adapted to be readily moved away from the line of flow of cans being fabricated to permit access thereto thereby facilitating immediate remedial action in the event of can jamming.

Another object relating to the problem of can jamming is to provide yieldable guide means movable out of operative position by the forces resulting from a can jam thereby to relieve said forces and prevent damage to the machine.

To this end and in accordance with a feature of the present invention, there is provided in a machine for soldering the side seams of can bodies, guide means for ensuring the alinement of can bodies being fabricated comprising a plurality of guide rods disposed on opposite sides of the path of can body flow and means mounting said guide rods comprising a plurality of mounting brackets having legs extending on opposite sides of the path of can body flow, fulcrum members adjustably mounted on said legs, lever members pivotally mounted on said fulcrum members for mounting said guide rods in position to engage a can body being fabricated, and means associated with said lever members whereby said guide rods are urged into yielding contact with a can body located in the machine.

The above and other features of the invention including various novel details of construction and combinations of parts will now be more particularly described with reference to the accompanying drawings and pointed out in the claims. It will be understood that the machine embodying the invention is shown by way of illustration and not as a limitation of the invention. The apparatus disclosed may be employed on a variety of machines, including side seam soldering machines having internal mandrels for guiding the can bodies introduced thereto. The principles and features of this invention may be utilized in varied and numerous embodiments without departing from the scope of the invention.

Figure 1:
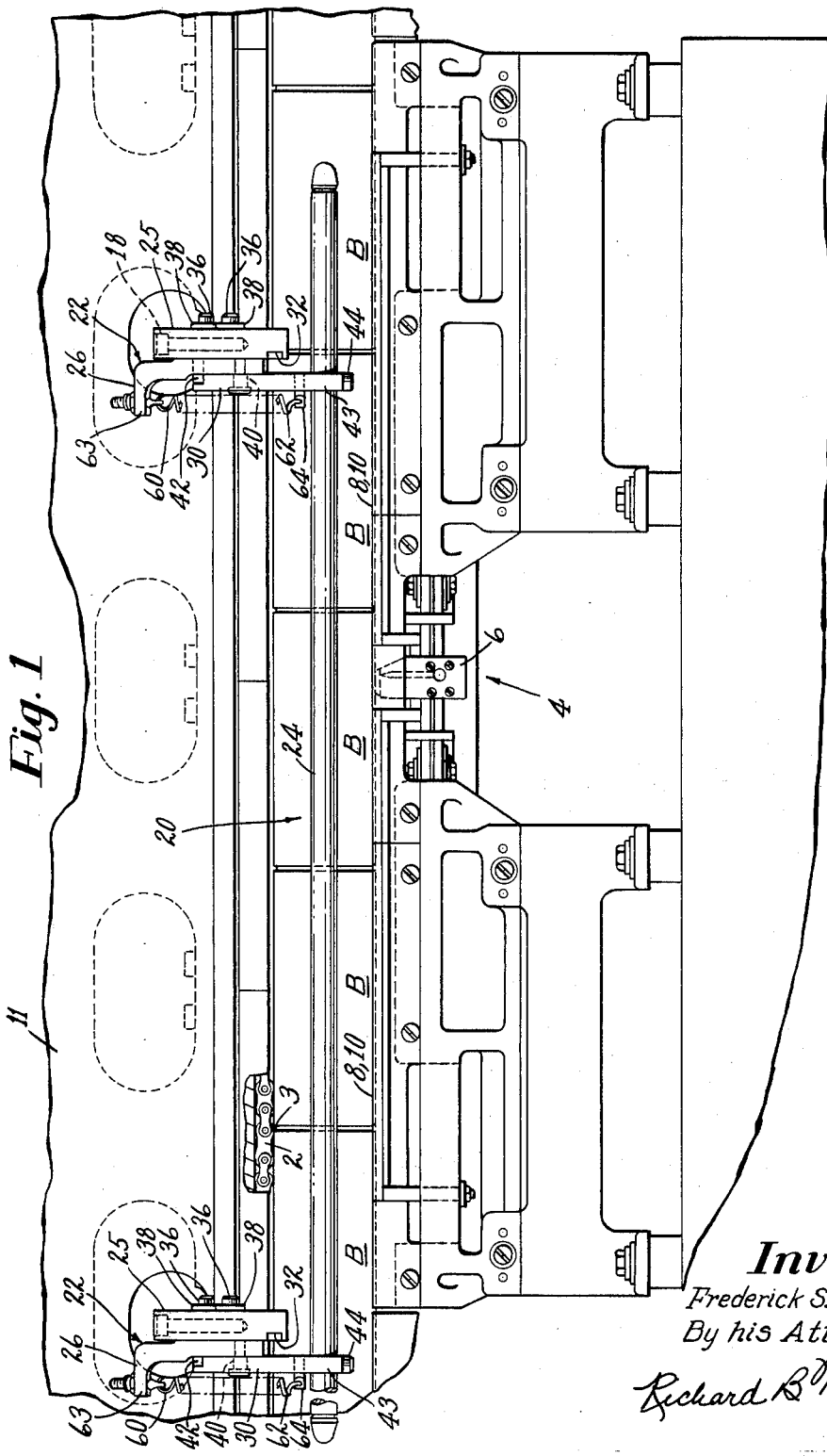
FIG. 1 is a side elevation of a can body soldering machine embodying the invention with parts broken away and having the guide means to be described hereinafter.
Figure 2:
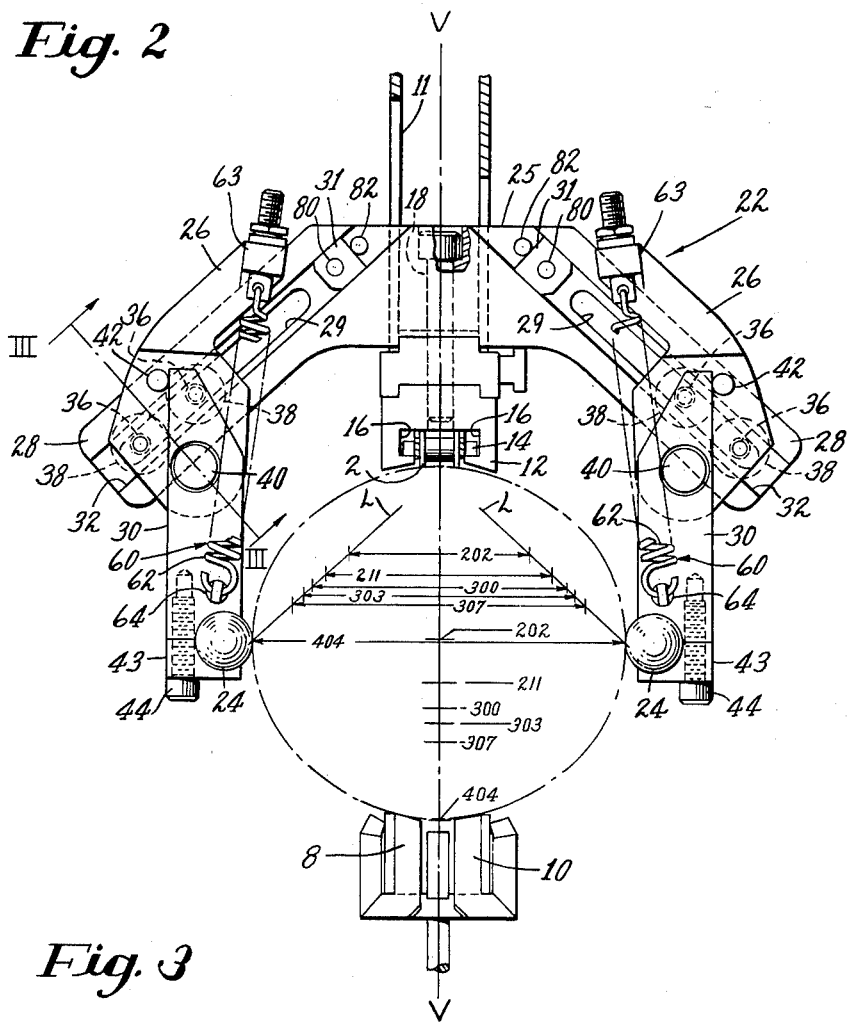
FIG. 2 is an enlarged front view of guide mounting means embodying the invention.

FIG. 1 shows can bodies B which were formed in a body-maker of any conventional type, not illustrated, being conveyed from left to right in a timed and spaced order by a machine having an endless chain 2 with feed dogs 3 located at predetermined spaced intervals. Each dog is engageable with the trailing edge of one can body, the spaces between adjacent bodies being equal to the length of the dogs. The bodies are conveyed past a soldering station 4 which may be of any convenient type, the solid rigid body solder applicator 6 illustrated in FIG. 1 and described in applicant's above referenced copending application being shown for purpose of discussion only. The can bodies B are supported on spaced, parallel guide rails 8 and 10 extending horizontally lengthwise of the machine. The can bodies are slightly compressed between the upper surfaces of the guide rails 8 and 10 and the conveyor chain 2, as shown in FIG. 2, and since there is no internal mandrel present, the bodies are free to yield and flex slightly.

The chain 2 passes over sprockets (not shown) mounted in a bridge 11 located in the upper portion of the machine and extending lengthwise thereof. As illustrated in FIG.

2, the chain 2 is supported in a guide 12 by studs 14 which project from the chain links and slide in guideways 16. The chain 2 will normally rest by its own weight on a can body but will yield upwardly when a can is interposed between it and the guide rails 8 and 10. The guide 12 is secured to the bridge 11 by a member 18. The guide rails 8 and 10 are adjustable vertically to accommodate various can sizes.

The inventive matter of the subject disclosure is embodied in guide means, generally indicated by the reference character 20, comprising a plurality of adjustable, yieldable mounting members 22, 22 and a plurality of guide rods 24, 24 affixed thereto and extending therebetween. The mounting members 22, 22 are identical in all respects and, for simplicity, the structure of only one of said mounting members will be described. As illustrated in FIG. 2, each mounting member 22 comprises a substantially inverted V-shaped mounting bracket 25 mounted in the bridge 11, fulcrum members 26, 26 adjustably mounted on respective legs 28, 28 of the V-shaped bracket 25, lever members 30, 30 pivotally mounted on the fulcrum members 26, 26, and set blocks 31, 31 for defining an adjusted position of said fulcrum members. The bracket 25 is affixed to the bridge 11 in proximity to the chain guide 12 and extends therethrough, the legs 28, 28 being disposed on opposite sides thereof and, therefore, on opposite sides of the path of travel of a can body introduced to said machine.

The various can sizes in commercial usage are generally designated by their body diameter and body height expressed as a whole number (i.e. the first digit indicating inches and the last two digits indicating sixteenths of an inch), the body diameter being the can diameter minus one-eighth of an inch and the body height being the can height plus one-eighth of an inch. Several of the standard size body diameters are 202, 211, 300, 303, 307 and 404. Referring to FIG. 2, these body diameters have been designated along lines occupied by the transverse major axis of a can body having the particular body diameter when such a can is positioned in the machine. When the various size can bodies are located in the machine, the guide rails 8 and 10 occupy the positions designated by the can size markings appearing along the vertical axis V—V of the machine. In the actual operation of the illustrated machine, the can bodies assume an ellipsoidal shape as a result of the pressure exerted by the chain 2 and the position of the guide rails 8, 10. The cross-marks indicated in FIG. 2 represent the terminal points or ends of the various major axis of the ellipsoidally configured cans. A line L, L drawn through the center of each cross-mark lying on a given side of the vertical axis V—V forms an angle of 42°30′ with a line normal to the vertical axis V—V. The specific can body sizes shown in FIG. 2 were selected at random to illustrate the characteristics of the lines L, L, it being understood that the terminal points of the major axis of all commercially available cans having the same cross-sectional configuration would lie on one of the lines L, L. It being further understood that the same principle applies to all commercially available cans having a given cross-sectional configuration; the specific angular relation being the only variable.

The bracket 25 has slots 29, 29 centrally located in the legs 28, 28 and extending along the length thereof. The longitudinal center lines of said slots generally form an angle of 42°30′ with a line normal to the vertical axis V—V. Ergo, the center lines of the slots are parallel to the line L lying on the same side of the vertical axis V—V. The bracket 25 is secured to the bridge 10 by the member 18. The bracket 25 also has channels 32, 32 located in each of the legs 28, 28 in alinement with the slots 29, 29, said channels 32, 32 being utilized to mount the fulcrum members 26, 26 as hereinafter described.

Figure 3:
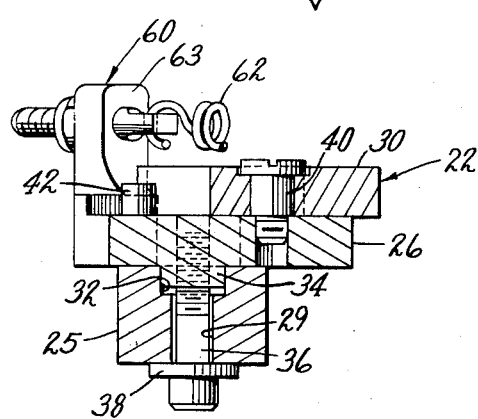
FIG. 3 is a sectional view taken on the line III—III of FIG. 2.

The fulcrum members 26, 26 are adjustably mounted on the legs 28, 28 of the bracket 25 to facilitate alternate positioning thereof whereby the location of the guide rods 24, 24 are determined, as hereinafter defined. As illustrated in FIG. 3, the fulcrum members 26, 26 have tongues 34, 34 on the lower surfaces thereof extending transversely along their mid-portions. The tongues 34, 34 are slidingly received in the channels 32, 32 in the legs 28, 28. The fulcrum members 26, 26 are retained in a given operative position on the bracket 25 by adjustable securing means 36, 36 extending through the legs 28, 28 of the bracket 25, the tongues 34, 34 and into the body of the fulcrum members. A given operative position of the fulcrum members 26, 26 is determined by tightening the securing means 36, 36 whereby washers 38, 38 are urged into contact with the lower surface of the bracket 25 thereby to secure the fulcrum members in a predetermined position on the bracket. The fulcrum members are thus slidable along a defined path on the bracket 25 and thereby adjustable in a plurality of operative positions. As a result of the alinement of the channels 32, 32 with the slots 29, 29, the path followed by a given point on the fulcrum members 26, 26 is parallel to the line L lying on the same side of the vertical axis V—V.

The lever members 30, 30 are pivotally mounted on the fulcrum members 26, 26 and spring means, to be hereinafter described, are employed to urge the guide rods 24, 24 resiliently into contact with a can body located in the machine. The fulcrum point of the lever members 30, 30 is determined by pins 40, 40 extending through the lever members 30, 30 and rotatively secured in the fulcrum members 26, 26. Pivotal movement of the lower end of the lever members 30, 30 toward the path of can body travel is limited by stop pins 42, 42 mounted on the fulcrum members 26, 26. The lever members 30, 30 are normally held in contact with the stop pins 42, 42 by spring means 60 to be hereinafter described. The guide rods 24, 24 are secured to the lower portion of the lever arms 30, 30 by mounting blocks 43, 43 and securing means 44, 44 and extend between the lever arms located on a given side of the path of travel of a can. The relative position of the guide rods 24, 24 on the lever arms 30, 30 is such that, when the fulcrum members 26, 26 slide along the bracket 25 in the channels 32, 32, the guide rods 24, 24 travel essentially along the line L lying on the same side of the vertical axis V—V. Thus, the guide rods 24, 24 can be readily located in a position corresponding generally to the terminal points of the transverse major axis of a given can size by sliding the fulcrum members 26, 26 into a given position on the bracket 25. The pins 42, 42 are positioned so that the guide rods 24, 24 normally contact can bodies passing through the machine and deflect the can bodies inwardly whereby a retaining pressure is applied thereto.

The spring means 60, 60 comprise springs 62, 62 opposite ends of which are mounted on the fulcrum members 26, 26 and lever members 30, 30 by mounting means 63, 63 and 64, 64, respectively. The forces exerted by the springs 62, 62 tending to cause pivotal movement of the lever members 30, 30 are in equilibrium when the center line of the spring is coincident with a diameter of the pins 40, 40. Accordingly, when the ends of the springs 62, 62 secured to the mounting means 64, 64 are urged toward the path of can travel from the equilibrium position, a component of the force exerted by the springs 62, 62 upon the lever arms 30, 30 would impart pivotal movement to said lever arms to locate the guide rods 24, 24 in operative position. Thus, the guide rods 24, 24 are yieldingly urged into contact with a can being fabricated at the major axis thereof during the operation of the machine. The amount of pressure exerted by the guide rods 24, 24 can be controlled by the positioning of the stop pins 42, 42 whereby the deflection of the can bodies by the guide rods is regulated. Conversely, when the ends of the springs 62, 62 secured to the mounting means 64, 64 are urged away from the path of can travel out of the normal operative position past the equilibrium position, a component of force exerted by the springs 62, 62 upon the lever arms 30, 30 would impart pivotal movement to said arms to locate the guide rods in an inoperative position. The guide rods can thus be pivoted away from the line of flow of can bodies being fabricated into a retracted, inoperative position to permit access thereto thereby facilitating immediate remedial action in the event of can body jamming. Further, the guide rods are yieldable in response to forces resulting from a can jam.

A given operative location of the fulcrum members 26, 26 is determined by appropriate sized set blocks 31, 31 positioned in the channels 32, 32 in abutting relation to the fulcrum members 26, 26. Various operative positions of the fulcrum members 26, 26 predicated on different can sizes are obtained by employment of a plurality of different sized set blocks. The set blocks 31, 31 are mounted in the channels 32, 32 in the bracket 25 by securing means 80, 80 and extend in the channels for various distances depending upon the size cans to be fabricated. Locating pins 82, 82 permanently mounted on the bracket 25 are employed to facilitate ready and accurate location of the set blocks 31, 31. Thus, by the provision of a plurality of set blocks of various predetermined lengths, adjustment of the subject apparatus to accommodate various can sizes is accomplished. In order to adjust the guide means for a particular can size, an operator need only remove the set blocks previously employed and attach new set blocks of the appropriate length.

Having thus described my invention, what I claim as new and desire to secure by Letters Patent of the United States is:

1. In combination with a machine for soldering the side seams of moving can bodies, guide means for ensuring the alignment of can bodies being fabricated comprising a plurality of guide rods disposed on opposite sides of the path of can body travel, means mounting said guide rods for movement between an operative position wherein said guide rods are engageable with can bodies in the machine and an inoperative position disposed from the can bodies to permit handling thereof, and means for urging said guide rods into resilient contact with can bodies located in the machine when the guide rods are in operative position.

2. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, lever members mounting said guide rods in position to contact can bodies being fabricated during the operation of the machine, means mounting said lever members on said mounting brackets for pivotal movement relative thereto, and means associated with said lever members for urging said guide rods into resilient, yielding contact with can bodies located in the machine.

3. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, lever members mounting said guide rods in position to contact can bodies being fabricated during the operation of the machine, means mounting said lever members on said mounting brackets for pivotal movement relative thereto, means associated with said lever members for urging said guide rods into resilient, yielding contact with can bodies located in the machine, and stop means for limiting the pivotal movement of said lever members thereby to limit the pressure which may be exerted by the guide rods on said can bodies.

4. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, lever members mounting said guide rods in a position whereby said guide rods are engageable with can bodies being fabricated during the operation of the machine, means mounting said lever members on said mounting brackets for pivotal movement relative thereto, and spring means associated with said lever members for urging said guide rods into resilient, yielding contact with can bodies located in the machine or into a retracted, inoperative position.

5. In combination with a machine for soldering the side seam of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, lever members mounting said guide rods in a position whereby said guide rods are engageable with can bodies being fabricated, means mounting said lever members on said mounting brackets for pivotal movement relative thereto, spring means associated with said lever members for urging said guide rods into an operative position in resilient, yielding contact with can bodies located in the machine or into a retracted, inoperative position, the selected position being determined by the location of the spring means relative to the equilibrium location thereof, and stop means for limiting the pivotal movement of said lever members to restrict the pressure which may be exerted by the guide rods on said can bodies.

6. In combination with a machine for soldering the side seam of moving can bodies, guide means for ensuring the alignment of can bodies being fabricated comprising a plurality of guide rods disposed on opposite sides of the path of can body travel, means mounting said guide rods for movement between an operative position wherein said guide rods are engageable with can bodies in the machine and an inoperative position disposed from the can bodies to permit handling thereof, means for adjusting the relative location of said guide rods with respect to the path of can body travel, and means for urging said guide rods into resilient contact with can bodies located in the machine when the guide rods are in operative position.

7. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for sliding movement thereon into a plurality of operative positions, lever members pivotally mounted on said fulcrum members for mounting said guide rods in position to engage can bodies being fabricated, and means associated with said lever members for urging said guide rods into resilient, yielding contact with can bodies located in the machine.

8. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for movement thereon into a plurality of operative positions, means mountable on said brackets to locate said fulcrum members in one of said operative positions, lever members pivotally mounted on said fulcrum members for mounting said guide rods in position to engage can bodies being fabricated, and means associated with said lever members for urging said guide rods into yielding contact with can bodies located in the machine.

9. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for sliding movement thereon into a plurality of operative positions, said sliding movement being confined substantially along a line parallel to a line defined by the terminal points of the transverse axes of cans to be fabricated lying on the same side of the path of can travel as the fulcrum members, lever members pivotally mounted on said fulcrum members for mounting said guide rods in position to engage can bodies being fabricated, and means associated with said lever members for urging said guide rods into yielding contact with can bodies located in the machine.

10. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for sliding movement thereon into a plurality of operative positions, said sliding movement being confined substantially along a line parallel to a line defined by the terminal points of the transverse axes of cans to be fabricated lying on the same side of the path of can travel as the fulcrum members, means mountable on said brackets to locate said fulcrum members in one of said operative positions, lever members pivotally mounted on said fulcrum members for mounting said guide rods in position to engage can bodies being fabricated, and means associated with said lever members for urging said guide rods into yielding contact with can bodies located in the machine.

11. In combination with a machine for soldering side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for movement thereon into a plurality of operative positions, lever members pivotally mounted on said fulcrum members for mounting said guide rods in position to engage can bodies being fabricated, and springs means associated with said lever members for urging said guide rods into yielding contact with can bodies located in the machine or into a retracted, inoperative position.

12. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for sliding movement thereon into a plurality of operative positions, lever members pivotally mounted on said fulcrum members for mounting said guide rods in position to engage can bodies being fabricated, spring means associated with said lever members for urging said guide rods into an operative position in yielding contact with can bodies located in the machine or into a retracted, inoperative position, the selected position being determined by the location of the spring means relative to the equilibrium location thereof, and stop means for limiting the pivotal movement of said lever members to restrict the pressure which may be exerted by the guide rods on said can bodies.

13. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for movement thereon into a plurality of operative positions, means mountable on said brackets to locate said fulcrum members in one of said operative positions, lever members pivotally mounted on said fulcrum members for mounting said guide rods in position to engage can bodies being fabricated, and spring means associated with said lever members for urging said guide rods into yielding contact with can bodies located in the machine or into a retracted, inoperative position.

14. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for movement thereon into a plurality of operative positions, means mountable on said brackets to locate said fulcrum members in one of said operative positions, lever members pivotally mounted on said fulcrum members for mounting said guide rods in position to engage can bodies being fabricated, spring means associated with said lever members for urging said guide rods into an operative position in yielding contact with can bodies located in the machine or into a retracted, inoperative position, the selected position being determined by the location of the spring means relative to the equilibrium location thereof, and stop means for limiting the pivotal movement of said lever members to restrict the pressure which may be exerted by the guide rods on said can bodies.

15. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for sliding movement thereon into a plurality of operative positions, said sliding movement being confined substantially along a line parallel to a line defined by the terminal points of the transverse axis of cans to be fabricated lying on the same side of the path of can travel as the fulcrum members, lever members pivotally mounted on said fulcrum members for mounting guide rods in position to engage can bodies being fabricated, and spring means associated with said lever members for urging said guide rods into yielding contact with can bodies located in the machine or into a retracted, inoperative position.

16. In combination with a machine for soldering the side seams of moving can bodies, guide means for ensuring the alinement of can bodies being fabricated comprising a plurality of guide rods disposed on opposite sides of the path of can body travel and means mounting said guide rods comprising a plurality of mounting brackets having legs extending on opposite sides of the path of can body travel, fulcrum members adjustably mounted on said legs for sliding movement thereon into a plurality of operative positions, said sliding movement being confined substantially along a line parallel to a line defined by the terminal points of the transverse axis of cans to be fabricated lying on the same side of the path of can travel as the fulcrum members, means mountable on said brackets to locate said fulcrum members in one of said operative positions, lever members pivotally mounted on said fulcrum members for mounting said guide rods in position to engage can bodies being fabricated, spring means associated with said lever members for urging said guide rods into an operative position in yielding contact with can bodies located in the machine or into a retracted, inoperative position, the selected position being determined by the location of the spring means relative to the equilibrium location thereof, and stop means for limiting the pivotal movement of said lever members to restrict the pressure which may be exerted by the guide rods on said can bodies.

References Cited by the Examiner

UNITED STATES PATENTS

| | | | |
|---|---|---|---|
| 707,951 | 8/1902 | Alexander | 193—40 X |
| 912,535 | 2/1909 | Brower | 198—1 |
| 1,440,385 | 1/1923 | Foster | 193—1 |
| 2,471,098 | 5/1949 | Davies | 101—35 |
| 3,030,904 | 4/1962 | Wagner et al. | 228—47 X |
| 3,056,368 | 10/1962 | Sillers | 29—503 |
| 3,057,515 | 10/1962 | Loeser | 221—242 X |
| 3,078,630 | 2/1963 | Mayer et al. | 221—242 X |

HUGO O. SCHULZ, *Primary Examiner.*

SAMUEL F. COLEMAN, *Examiner.*

A. L. LEVINE, *Assistant Examiner.*